United States Patent

Vlahos

[15] 3,683,325

[45] Aug. 8, 1972

[54] EXTENDED RANGE SONAR SYSTEM

[72] Inventor: Petro Vlahos, Los Angeles, Calif.

[73] Assignee: System Development Corporation, Santa Monica, Calif.

[22] Filed: Feb. 8, 1967

[21] Appl. No.: 614,603

[52] U.S. Cl............340/3 R, 340/3 FM, 343/17.1 PF, 343/17.2 R
[51] Int. Cl..................................................G01s 9/68
[58] Field of Search............340/3; 343/17.2, 17.1 PF

[56] References Cited

UNITED STATES PATENTS

| | | | |
|---|---|---|---|
| 3,212,053 | 10/1965 | Finney | 340/3 |
| 3,302,161 | 1/1967 | Ellison | 340/3 |
| 3,324,469 | 6/1967 | Szerlip | 343/17.2 |

Primary Examiner—Richard A. Farley
Attorney—Fulwider, Patton, Rieber, Lee & Utecht

[57] ABSTRACT

An extended range sonar in which a projected carrier sound frequency is modulated by second and third lower sound frequencies and a train of alternate pulses of the second and third frequency modulated carrier frequency are projected at a fourth frequency switching rate. The echo signal is extracted from the total received signal by first abstracting the second and third frequency components of the envelope of the received signal; abstracting the fourth frequency component of the envelope of each of the second and third frequencies and combining the separate fourth frequencies components of the second and third frequencies to secure an echo signal indicating the presence of a discrete target.

16 Claims, 9 Drawing Figures

INVENTOR.
PETRO VLAHOS
BY Fulwider, Patton, Rieber
Lee, and Utecht
ATTORNEYS

INVENTOR.
PETRO VLAHOS
BY Fulwider, Patton, Rieber, Lee, and Utecht
ATTORNEYS

3,683,325

EXTENDED RANGE SONAR SYSTEM

CROSS-REFERENCE TO RELATED APPLICATION

There is no pending application to which the present application relates.

BACKGROUND OF THE INVENTION

1. The present invention is directed to the field of active sonar systems wherein a pulse of sound is projected into the water and when reflected back as an echo denotes the existence of a discrete target or other underwater object and provides information from which the range and bearing of the object relative to the sound projector can be determined.

2. Present techniques and systems of sonar detection are limited in range due to power limitations and sea noise. At maximum sonar range the echo signal from the submerged object is lost in noise generated by wave action, marine organisms and the like. Noise competing at the same frequency as the echo echo makes detection difficult unless the signal is sufficiently greater than the noise level, thus limiting the range at which sonar detection is effective.

References descriptive of present sonar equipment and techniques may be found in Introduction to Sonar, NavPers 10130–A, Second Edition, 1963; McGraw-Hill Encyclopedia of Science McGraw-Hill Technology, McGraw-Hill Book Company, Inc., 1960, pages 502–504; Introduction to Sonar Technology, NavShips 0967-129-3010, Dec. 1965; and Fundamentals of Sonar by J. W. Horton, U.S. Naval Institute, 1965. The present invention extends the effective range of sonar detection by coding the projected signal in a unique manner so that the code in the echo signal may be extracted from noise even though the noise contains all of the frequencies used in the code.

SUMMARY OF THE INVENTION

In general, the lower the frequency the longer the range of the active sonar detection system but the larger is the transducer head required to project the sound pulse and the larger the power requirements and the lower ranges of frequency can only be used with relatively large ships. At higher frequencies the transducer head and the power requirements are smaller but the effective detection range is lowered. The sound frequencies employed may be in the range of 1,000–200,000 cycles per second or beyond, many sonar systems using a typical compromise of 26,000 cycles per second as the carrier sound frequency. This carrier frequency may be modulated, by way of example, between 400–600 cycles per second with continuous variation over the length of the projected pulse to produce a "chirp" sound which is more readily distinguishable as an echo signal from the volume and boundary reverberation noise present in the received signal.

A primary object of the present invention is to extend the effective range of sonar detection or to secure the same range with smaller head and power requirements. This requires the abstraction of echo signal information from the total signal received at a lower level relative to the noise level. According to the separate invention the carrier sound frequency is modulated by two seaparate second and third frequency tones and a burst of the carrier frequency modulated by the second and third frequencies is projected in a series or train of alternate, interleaved pulses. Switching of the successive, interleaved pulses of the second and third frequency modulated carrier frequency is conducted at a fourth frequency at which intelligence is finally extracted from the received signal. The total burst pulse emitted by the active sonar head may be a train of pulses of the second and third frequency modulated carrier frequency which are time-shared 50% for maximum time utilization of the pulse train.

The total signal received by the sonar receiver head includes noise from reverberation and reflection and, when a target is present within effective range, an echo signal which is a reflection of the projected pulse train burst. Detection of an echo signal in conventional sonar requires the echo signal level to be greater than the noise level since detection is based on amplitude differences. With the sonar coding system of the present invention intelligence of the existence of a target may be abstracted from a total signal having a high noise to echo signal ratio. The envelopes of the second and third frequency modulators are first abstracted from the received signal and the envelopes of the fourth or switching frequency are abstracted from each of the modulating frequencies. These two separate switching frequency signals are then combined differentially to provide for detection of an echo signal when the combination of echo signal and noise at the switching frequency is clearly different from the noise only signal. The coding system of the present invention greatly extends the effective range of active sonar detection for a given size transducer head and power supply by abstracting significant target information when an echo signal is substantially below the noise level.

The combination of the two signals at the switching frequency may be by both sum and difference, with the waveforms of the resultants displayed on a cathode ray tube, a "Memoscope" or on a recording tape. The two signals may be combined in an electronic analysis circuit to avoid the requirement for human visual comparison, or may be otherwise combined in more sophisticated circuitry within the intended scope of the present invention.

DESCRIPTION OF THE PREFERRED EMBODIMENTS

The range of active sonar detection is limited by the power of the transmitted pulse, absorption of the signal by the water, and by sea noise, the latter extending over the entire audio spectrum and competing with an echo signal in the receiver. There is no unique sonar frequency at which sea noise is absent and detection of an echo signal normally requires that it be greater than the noise level, detection being based on amplitude differences.

The present invention assumes that noise may be of the same frequency as the echo signal and that the noise is varying in amplitude and phase is a non-predictable or random manner According to the present invention the projected signal is coded in such a manner that the character of the echo signal plus noise is detectably different than the character of the noise alone even when the noise level is considerably higher than the level of the echo signal.

Conventionally, a sonar head is pulsed at its resonant frequency which is ordinarily above the audio spectrum of the ear and the projected carrier pulse is conventionally modulated with a lower frequency audio tone such as a varying 400–600 cycles per second, as previously described, to produce a more readily detectable "chirp" sound. Alternatively, the carrier frequency may be beat against a local oscillator in the receiver to produce an audible tone. The sonar head is normally sensitive to a very small band of frequencies centered about its resonant frequency and this resonant property provides an initial discrimination against passing all of the noise spectrum in the received signal outside the pass band of the head.

Figure 1:
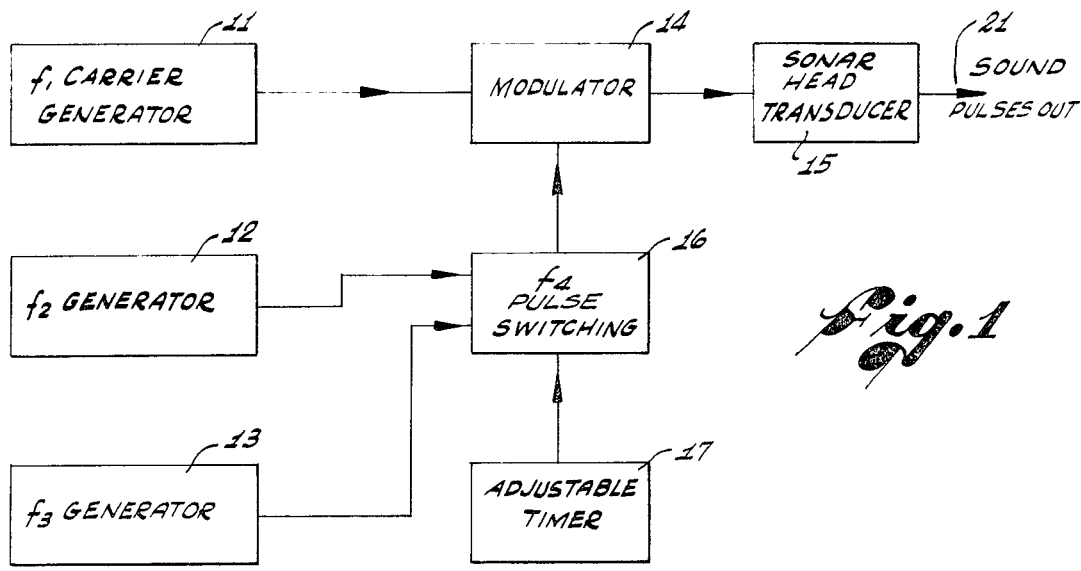
FIG. 1 is a diagrammatic representation of an active sonar projector according to the present invention.

Referring to FIG. 1, the active sonar projector according to the present invention employs an electrical generator 11 for the carrier frequency $f_1$ which may vary between 1,000 and 200,000 cycles per second or even beyond, but of which a typical compromise is 26,000 cycles per second. A pair of electrical generators 12 and 13 generate frequencies $f_2$ and $f_3$ which are used to modulate the carrier frequency $f_1$ in a modulator 14. A sound burst train 21 of alternate or interleaved pulses of the $f_2$ and $f_3$ modulated $f_1$ carrier are projected in the water from a sonar head transducer 15 which receives electrical signals from the modulator 14. Pulses of the modulating frequencies $f_2$ and $f_3$ are fed to the modulator 14 by a switching device 16 controlled by an adjustable timer 17 as to both individual pulse length and the length of the burst train of pulses.

Figure 2:
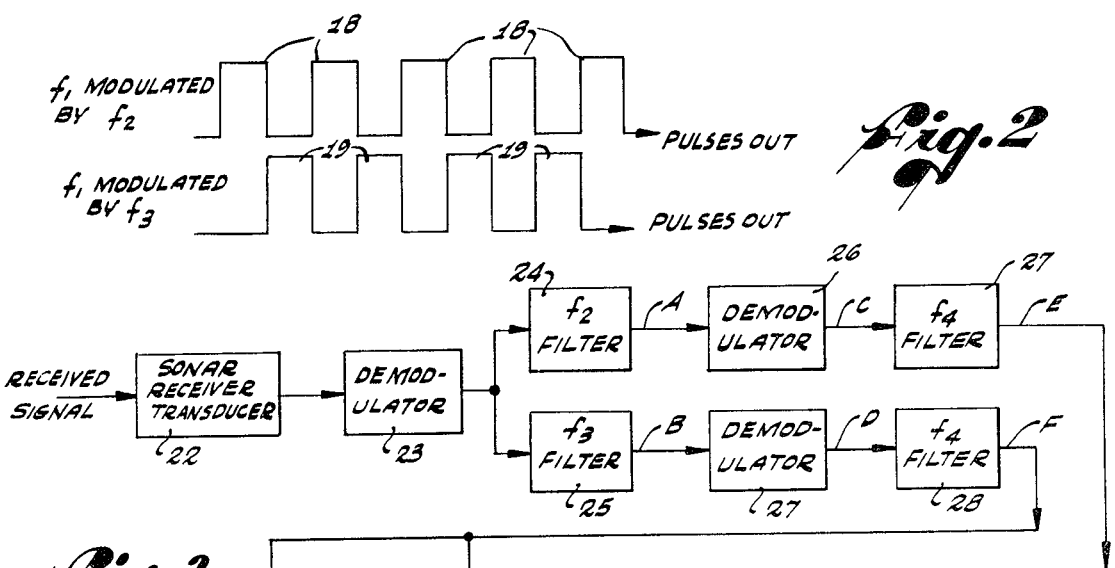
FIG. 2 is a representation of the train of interleaved pulses projected by the system of FIG. 1.

The pulses transmitted by the switching means 16 preferably provide for 50 percent time sharing by the $f_2$ and $f_3$ tones, as indicated in FIG. 2 wherein the pulses 18 of the $f_1$ carrier frequency modulated by the frequency $f_2$ are interleaved with pulses 19 of the $f_1$ carrier frequency modulated by the frequency $f_3$. The pulses 18 and 19 are interleaved in alternating fashion and are 180° out of phase.

Figure 3:
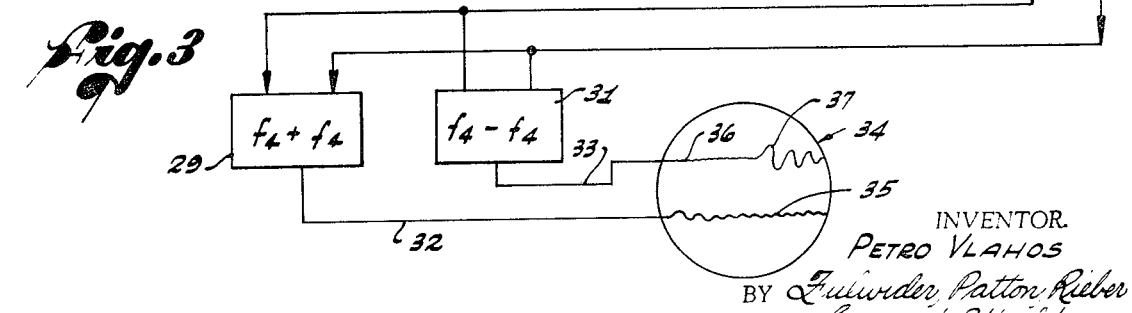
FIG. 3 is a diagrammatic representation of a sonar receiver according to the present invention including one manner combining the switching frequency signals.
Figure 6:
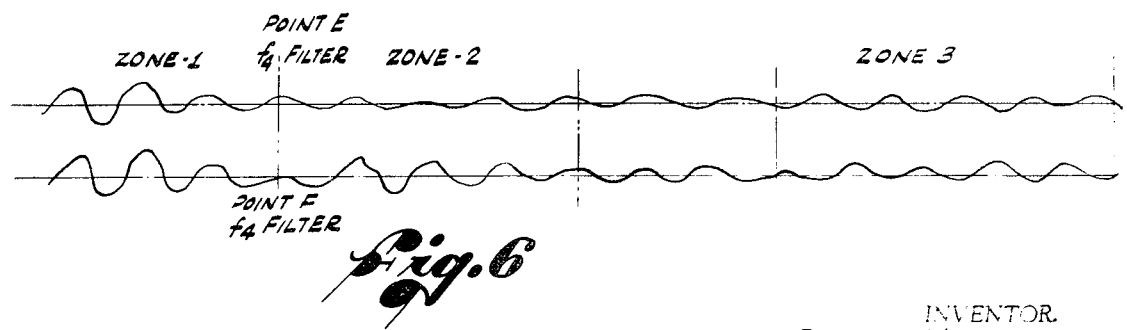
FIG. 6 represents the signal wave forms at points E and F of FIG. 3, resulting from passing the wave forms of FIG. 5 through filters passing the pulse-switching frequency.

It is desired that a relatively large number of cycles corresponding to pulses in the train be available for comparison or combination at points E and F of FIG. 3, of the character illustrated in FIG. 6. The pulse-switching frequency $f_4$ established by the switching device 16 will therefore be selected by the time duration of the individual pulses and the number of cycles which it is desired to sample at points E and F. By way of example only and without limitation, if the pulses 18 and 19 have a duration of 0.005 seconds and the number of each of 18 and 19 pulses desired is set at 50 in a burst train with a total length of 0.5 seconds, the switching frequency $f_4$ becomes 100 per second.

Another consideration in selecting frequency values is the desire to modulate a relatively large number of cycles of the frequencies $f_2$ and $f_3$ by switching frequency $f_4$ and a relatively large number of cycles of the $f_1$ carrier by frequencies $f_2$ and $f_3$. Frequencies ti $f_2$ and $f_3$ must be located between the switching frequency $f_4$ and the carrier frequency $f_1$ and desirably sufficiently separated so that they may be readily separated in the demodulating and filtering circuits. By way of example only and without limitation, frequencies $f_2$ and $f_3$ may be selected at 1,000 and 1,500 cycles per second, respectively, with an $f_1$ carrier frequency of 26,000 cycles per second and an $f_4$ switching frequency of 100 per second.

In operating the sonar system a sound burst 21 of, for example, only one-half second duration, is projected from the sonar head transducer 15 and then a listening period transpires corresponding to the round trip time for passage of the sonar pulse to the limit of effective range for the detection of an echo signal. For example, since sound travels through water at approximately 1 mile per second, if the limit of effective echo signal detection is five miles, the pulse train burst would be sent out approximately 1 every 10 seconds to allow time for the projected burst to travel to a distant target and the echo to be reflected back to the sonar head receiver. The burst duration can be varied, for example, between 0.2 second and 2.0 seconds by the timer 17, depending on operating conditions at the time of sonar scan.

Conventional sonar techniques are followed in azimuth stepping of the pulse train by the band width angle of the projected pulses to cover the area being investigated. Other conventional techniques are used in computing range and bearing and in utilizing doppler effects to determine the course and speed of the target.

During the listening period between pulse train bursts a signal is received at the sonar receiver transducer 22 of FIG. 3 which will be made up of sea noise and a possible echo signal. Noise extends over the entire audio spectrum and therefore competes with the echo signal, if any, in the receiver, and will include noise at all of the frequencies $f_1, f_2, f_3,$ and $f_4$.

Figure 4:
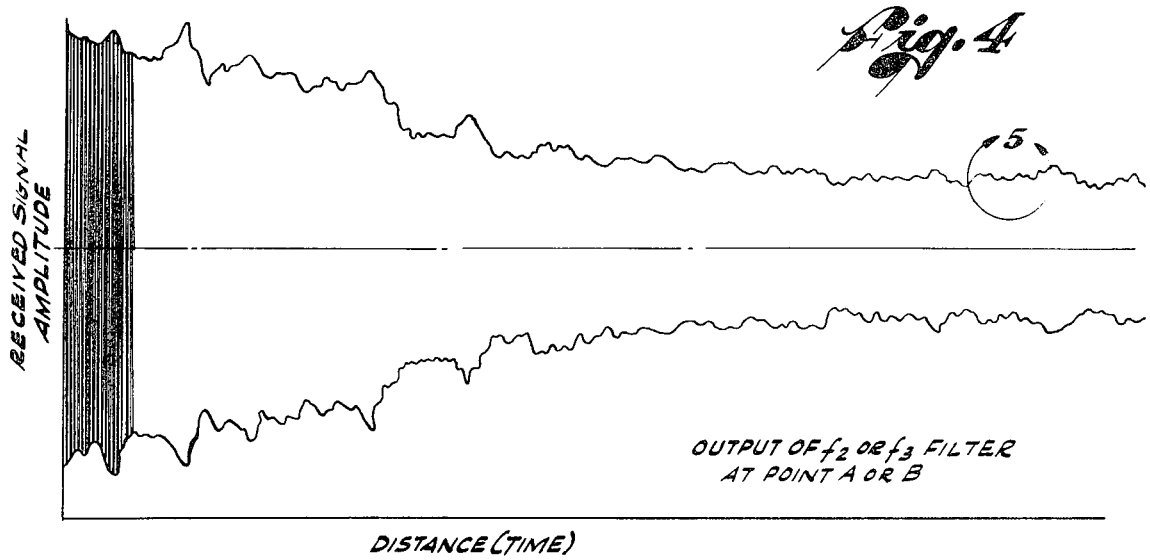
FIG. 4 is a representation of a typical signal envelope containing either the second or third modulating frequency at either point A or B of FIG. 3.

The resonant property of the sonar head receiver provides an initial filter against the general noise spectrum outside its pass band. The sound frequencies received by the sonar receiver transducer 22 are transformed into electrical signals and demodulated by a demodulator 23 to eliminate the $f_1$ carrier frequency and the resulting envelope is fed to $f_2$ and $f_3$ filters 24 and 25, respectively, which pass only frequencies adjacent $f_2$ and $f_3$, depending upon the band width of the filters. The output of either filter 24 or 25 at point A or point B is represented in FIG. 4 as a signal wave form which is varying in intensity at the $f_2$ or $f_3$ frequency. The wave forms for both $f_2$ and $f_3$ will be substantially identical but may differ to some extent as the carrier side bands may be unequally affected by multiple reflection paths. The output of $f_2$ filter 24 is passed through a demodulator 26 to eliminate $f_2$ frequency and then passed through an $f_4$ filter 27. The output of $f_3$ filter 25 is passed through a demodulator 27 to eliminate $f_3$ and then passed through an $f_4$ filter 28. The output of demodulator 26 is indicated at point C and of demodulator 27 at point D. The output of $f_4$ filter 27 is indicated at point E and of $f_4$ filter 28 at point F.

In the comparison portion of the receiver circuit of FIG. 3, the output of $f_4$ filters 27 and 28 are fed to addition circuits 29 and subtraction circuits 31, the sum appearing on line 32 and the difference on line 33. Lines 32 and 33 lead to a readout or display device 34 which may be a cathode ray tube, a "Memoscope" or a recorder employing a stylus or ink pen writing on a chart tape.

Since the $f_2$ and $f_3$ modulated pulses 18 and 19 are alternated or interleaved as shown in FIG. 2, the echo signals at points E and F, if a target is present and an echo or reflection signal exists, will be out of phase 180°. Therefore the summing circuit 29 cancels out any echo signal which may be present at E and F to give a noise only signal on line 32 represented by the trace 35. On the other hand, the difference or subtraction circuit 31 places the echo signal from E and F in-phase to double the echo signal on line 33 and effect substantial cancellation of the noise signal to give a trace 36 having a low noise amplitude and a doubled echo signal at trace portion 37 in the readout device. The presence of the large amplitude trace at 37 without a comparable increase in the amplitude of the noise trace 35 indicates that a reflecting target has been located by the sonar pulse train.

Figure 5:
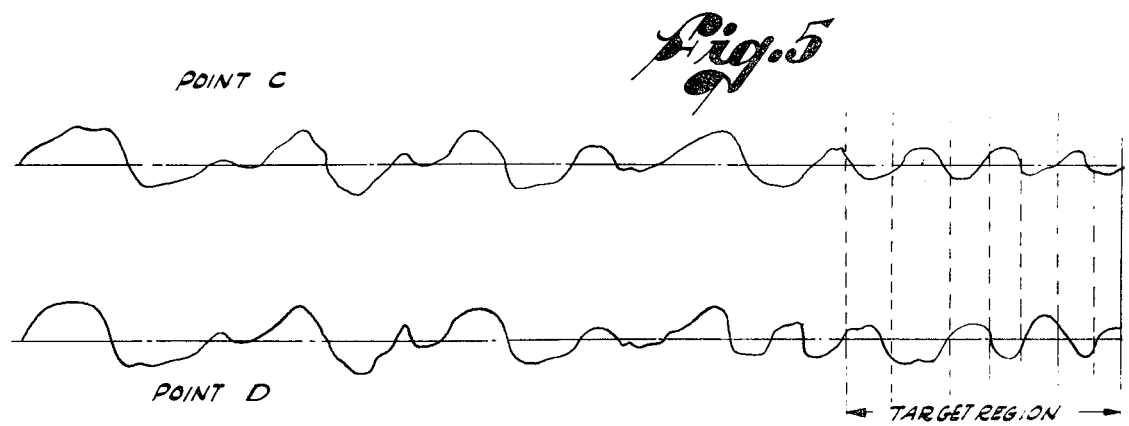
FIG. 5 represents the demodulated wave form within the circle 5 of FIG. 4 for both modulating frequencies at points C and D of FIG. 3.

The circled portion 5 of FIG. 4 has been selected for the location of a target at the distance represented thereby. The variable amplitude of the circled area of FIG. 4 is examined for both modulated signals in FIG. 5 after demodulation at demodulators 26 and 27 to eliminate frequencies $f_2$ and $f_3$, respectively. The wave forms of FIG. 5 represent the amplitude fluctuations of tones $f_2$ and $f_3$ which are caused by reverberation and by reflection from discrete objects. Since both $f_2$ and $f_3$ were varying from off to on, some of the envelopes of FIG. 5 represent target reflection. Because $f_2$ and $f_3$ modulated pulses were interleaved, there is a substantially 180° out of phase relationship between the components of the two wave forms of FIG. 5 which correspond to the echo signal. These components occur only in the right-hand portion of FIG. 5 which is designated "TARGET REGION" and whose wave forms include a combination of noise and echo signal.

The $f_4$ filters 27 and 28 have a band width which passes more than the exact frequency $f_4$ of 100 cycles per second, for example between 96–104 cycles per second. It will be understood that the echo signal at this point is always at the switching rate of 100 cycles per second and that there will also be noise at this exact frequency as well as over the range of 96–104. The outputs of the filters 27 and 28 at points E and F are represented in FIG. 6, producing wave forms resulting from fluctuation of the reverberation at or near the 100 cycle rate, as well as from echo signal.

Figure 7:
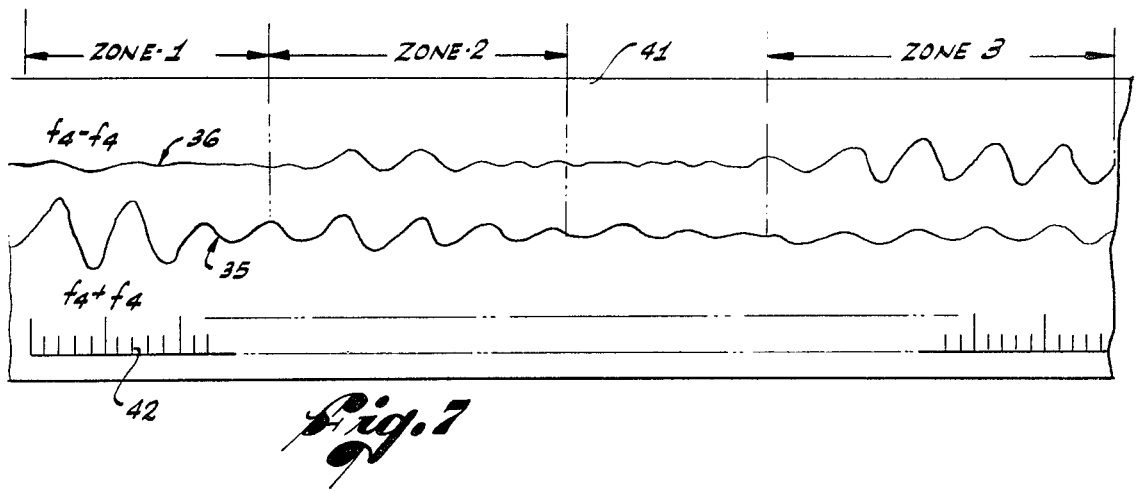
FIG. 7 shows a recording tape having thereon traces of the sum and difference of the switching frequency signals of FIG. 6.

For analysis, the wave forms at points E and F are divided into three portions designated in FIGS. 6 and 7 as zone 1, zone 2 and zone 3. Ordinary fluctuations in reverberation are substantially in-phase and of equal amplitude in zone 1. Where transmission anomalies reduce the level of either the $f_2$ or $f_3$ signal, the wave forms are in-phase but of unequal amplitude, as shown in zone 2. Where a discrete target is present, coherence of the switched $f_2, f_3$ frequencies is maintained and this coherence is evident in the phasing in zone 3 where the echo signal components are out of phase and of substantially equal amplitude.

FIG. 7 illustrates a portion of a recording strip or tape 41 from a strip chart recorder such as 34 of FIG. 3 in which the output of the difference circuitry 31 is recorded on wave form 36 and the output of the summation circuitry 29 is recorded on wave form 35. The manner of recordation will depend upon the type of recorder used of which a stylus or writing pen is perhaps the simplest. The sum and difference wave forms 35 and 36, whether on a cathode ray tube or "Memoscope," are drawn on a tape 41, permit a visual analysis of the presence of a discrete target within sonar range.

The recorder tape 41 may include a calibrated time scale 42 by which the time and therefore distance to the target may be determined for the velocity of sound under the water conditions existing at the time the sonar scan is made. the time and therefore distance to the target may be determined for the velocity of sound under the water conditions existing at the time the sonar scan is made.

The zone portions of the wave forms of FIG. 6 selected for analysis are carried over into the wave forms 35 and 36 of FIG. 7. Referring to the difference signal wave form 36 of FIG. 7, in zone 1 the ordinary in-phase, equal amplitude fluctuations subtract substantially to zero. Since the amplitudes in zone 2 were unequal the difference of the wave forms of FIG. 6 shows less cancellation in this zone. From the discrete target in zone 3 the coherence of the echo signals is maintained and are in FIG. 6 substantially 180° out of phase because of the interleaving of the individual $f_2$ and $f_3$ modulated pulses 18 and 19. Subtraction of the echo signals in zone 3 move the signals into an in-phase relationship which combines them to double amplitude.

The output of the summation circuits 29 embodied in the wave form 35 of FIG. 7 gives a double amplitude wave form in zone 1 of FIG. 7. The sum in zone 2 adds to a greater amplitude than either of the wave forms in that zone in FIG. 6. The sum of the signals in zone 3 results in substantial cancellation of the echo signal to produce a signal wave form due to noise only which is less than either of the zone 3 wave forms of FIG. 6. Therefore, by visual inspection of the tape record of FIG. 7 or from a scope display, when the difference wave form is larger than the sum wave form, as in zone 3, a discrete target is present at a distance measurable on the time scale 42.

Figure 8:
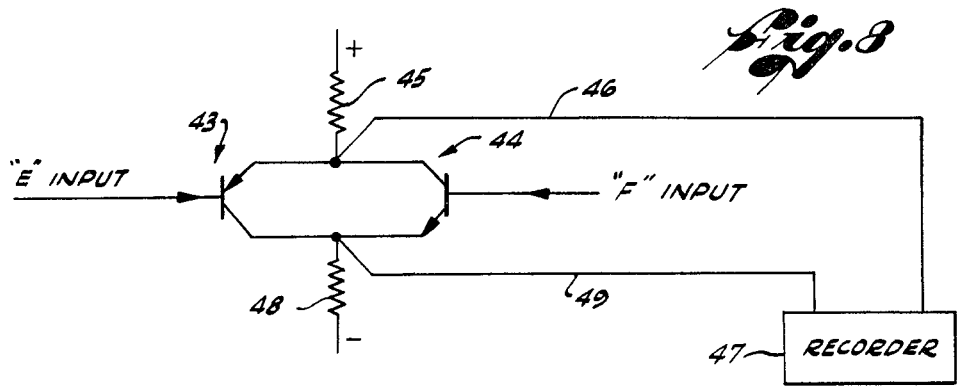
FIG. 8 is a simple analysis circuit to identify an echo signal in the wave forms of FIG. 6.
Figure 9:
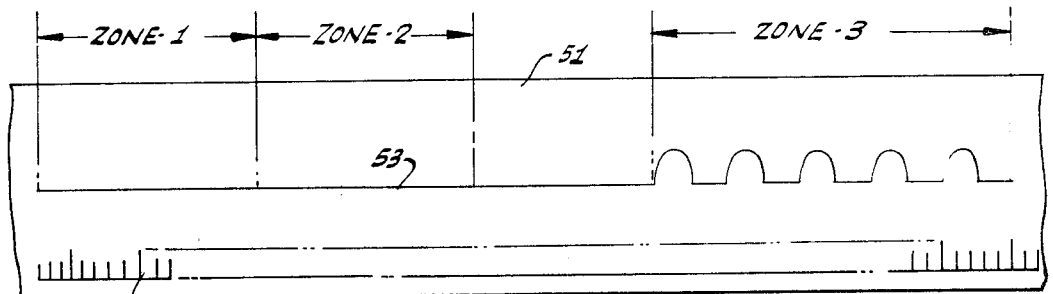
FIG. 9 shows a recording tape of the output of the analysis circuit of FIG. 8 and containing an echo signal.

The visual analysis provided by the recorder tape 41 or on a scope display can be replaced by electronic analysis in the circuit of FIG. 8 which may also be recorded on tape as in FIG. 9.

The analysis circuit of FIG. 8 employs a PNP transistor 43 and an NPN transistor 44, the emitter of transistor 43 being connected to the collector of transistor 44 and through resistor 45 to the positive side of the supply and by a line 46 to a recorder 47. The collector of transistor 43 is connected to the emitter of transistor 44 and through a resistor 48 to the negative side of the supply and by a line 49 to the recorder 47. The base of transistor 43 is connected to the output of $f_4$ filter 27 at point E and the base of transistor 44 is connected to the output of $f_4$ filter 28 at point F. A recorded tape 51 is shown at FIG. 9 as the output of the recorder 47, the tape having a calibrated time scale 52 thereon and the recorded wave form 53 showing a circuit output only in the zone 3 target region.

The circuit of FIG. 8 analyzes the $f_4$ filter outputs as follows: There is no output when E is negative, F is positive, or both are zero. Referring back to the three zones of FIG. 6 for the wave forms of the signals at E and F, in zone 1 the signals are in-phase and of the same polarity and the analysis circuit has no output, as indicated by the base line on the tape 51 of FIG. 9. In zone 2 the signals are still in phase and even though of unequal amplitude there is no output, as again indicated by the base line recorder tape 51. In zone 3 the echo signal components are out of phase by 180° to produce an output shown in the zone 3 portion of the record on tape 51.

The circuit of FIG. 8 produces the half wave output shown in FIG. 9 but if a full wave recording is desired two diodes may be used at each of the inputs E and F with cross-connection between the diodes to produce a full wave signal to the recorder.

Varying ocean conditions may offer different obstruction to passage of differently modulated pulses so that pulses modulated at frequencies other than $f_2$ and $f_3$ may be propagated with less absorption and return a stronger echo signal. For this reason it may be desired to follow the first sound burst with immediately succeeding bursts of $f_1$ modulated by $f_5$ and $f_6$ and $f_1$ modulated by $f_7$ and $f_x$ etc. and the echo signals at these frequency modulations be separately examined in receiver circuits duplicating that of FIG. 3 but with filters for the modulating frequency signals being examined.

It will therefore be seen that the sonar system according to the present invention extends the range in which a discrete target may be detected or permits the use of a smaller head and less power for the same range. With the coding of the sonar sound burst in a series of alternate, interleaved pulses of different tone modulation and the proper analysis of the signal reception in the system, intelligence of the existence of a discrete target may be extracted at ratios of echo signal level to noise level which are much lower than provided by present techniques where the echo signal would be lost in noise. The system places less emphasis on human interpretation of the received signal and therefore permits the presence of a target to be determined with less highly trained personnel than required by conventional techniques where separation of the echo signal from the noise level at the range limit is extremely difficult. The system of the present invention combines the advantages of either extended range for given size and power or the use of smaller heads and power for the same range with a graphic representation of the echo signal which is easily detectable even at extreme range.

While certain preferred embodiments of the invention have been specifically illustrated and described it will be understood that the invention is not limited thereto as many variations will be apparent to those skilled in the art and the invention is to be given its broadest interpretation within the terms of the following claims.

I claim:

1. An active sonar system comprising:
   means for projecting a sound burst comprised of alternate pulses of a first sound frequency discretely modulated by second and third lower sound frequencies in the alternate pulses, said pulses alternating at a fourth and still lower frequency rate;
   means for receiving a signal after said burst has been terminated;
   means abstracting the second and third frequency components of the envelope of the received signal;
   means abstracting the fourth frequency component of each of the envelopes of the second and third frequency components;
   and means combining the separate fourth frequency components of the second and third frequencies to secure an echo signal indicating the presence of a discrete target.

2. The sonar system defined in claim 1 including:
   means for generating a first electrical frequency in the sound range;
   means for generating second and third electrical frequencies in the sound range but below said first frequency;
   means for modulating said first frequency;
   means for connecting said two separate frequencies alternately to said modulator at a predetermined fourth frequency rate;
   and a sonar head transducer fed by said modulator for projecting a train of interleaved pulses of sound at said first frequency modulated alternately by said second and third frequencies.

3. The sonar system defined in claim 2 including:
   means for adjustably controlling the times in which the second and third frequencies are connected to the modulator and the burst time over which the train of pulses is projected.

4. The sonar system defined in claim 1 including:
   means for subtracting said separate fourth frequency components of the second and third frequencies so as to diminish the amplitude of the noise only signal and increase the amplitude of the echo signal included in said fourth frequency components.

5. The sonar system defined in claim 4 including:
   means for displaying the wave form of the difference between said separate fourth frequency component so as to indicate by the increased amplitude of the wave form the presence of a discrete target.

6. The sonar system defined in claim 4 including:
   means for adding said separate fourth frequency components of the second and third frequencies to increase the amplitude of the noise signal and cancel out the echo signal from the sum;
   and means for displaying the sum and difference resultants for direct comparison to indicate by the presence of an increased amplitude in the difference resultant which is not present in the summation resultant the presence of a discrete target reflecting an echo signal.

7. The sonar system defined in claim 1 including:
an analysis circuit;
means for feeding said separate fourth frequency components of the second and third frequencies into said analysis circuit,
said analysis circuit operating to give an output only when said separate fourth frequency components include substantial out of phase components caused by an echo signal from a discrete target.

8. The sonar system defined in claim 7 including:
means for recording the output of said analysis circuit on a time scale chart to indicate by the presence and position of a circuit output the existence of and distance to a discrete target.

9. The sonar system defined in claim 7 in which:
said analysis circuit comprising a pair of transistors having their bases connected respectively to said separate fourth frequency components of the second and third frequencies;
and means reversely connecting the collectors and emitters of said transistors together and to a power source and to output lines.

10. The sonar system defined in claim 1 in which:
said first sound frequency being substantially within the range of 1,000–200,000 cycles per second,
said fourth frequency being of a value to secure a relatively large number of pulses in a burst of substantially one-half second duration,
and said second and third sound frequencies being intermediate the first sound frequency and said fourth frequency.

11. The sonar system defined in claim 1 in which:
said first sound frequency being substantially within the range of 1,000–200,000 cycles per second,
said second and third sound frequencies being sufficiently lower than said first sound frequency so as to modulate a substantial number of cycles thereof,
and said fourth frequency being sufficiently low as to pass a substantial number of cycles of the second and third modulating frequencies but sufficiently high to pass a substantially large number of pulses in a burst of not substantially over two seconds in length.

12. The sonar system defined in claim 2 in which:
said first frequency being substantially of the order of 26,000 cycles per second,
said second and third frequencies being substantially of the order of 1,000 and 1,500 cycles per second, respectively,
and said alternate connection rate being substantially of the order of 100 per second.

13. The sonar system defined in claim 2 including:
a sonar receiver transducer;
a demodulator fed by said transducer to eliminate the first frequency;
second and third frequency filters fed by said demodulator to abstract the second and third frequency components of the demodulator output;
a demodulator for each of said second and third frequency components to eliminate said second and third frequencies from the signal;
and fourth frequency filters fed by each of said last-mentioned demodulators to provide the separate fourth frequency components of the second and third frequencies which are combined to secure an echo signal indication.

14. The sonar system defined in claim 13 and including:
a subtraction circuit to which said separate fourth frequency components are fed to substantially erase in-phase components and add out of phase components thereby doubling the amplitude of the out-of-phase echo signal.

15. The sonar system defined in claim 14 including:
a summation circuit to which said separate fourth frequency components are fed to increase the amplitude of the in-phase components and cancel the out of phase echo signal components;
and means for displaying together the outputs of said subtraction and summation circuits to facilitate detection of an increased amplitude signal in the difference circuit output not present in the summation circuit output.

16. A sonar system as defined in claim 13 including:
an analysis circuit receiving the outputs of said fourth frequency filters and providing an output from the analysis circuit only when the outputs of the fourth frequency filters have substantial out of phase components to thereby indicate, by the presence of an analysis circuit output, the existence of an echo signal in said fourth frequency filter outputs.

* * * * *